(12) United States Patent
Zeloof et al.

(10) Patent No.: US 8,066,032 B2
(45) Date of Patent: Nov. 29, 2011

(54) APPARATUS FOR INSTANTANEOUSLY TERMINATING MOVEMENT OF FLOW MATERIAL THROUGH A CONDUIT

(75) Inventors: Haskel Zeloof, Stockton, NJ (US); James Vena, Stockton, NJ (US)

(73) Assignee: Diversatech, Inc., Pennington, NJ (US)

( * ) Notice: Subject to any disclaimer, the term of this patent is extended or adjusted under 35 U.S.C. 154(b) by 481 days.

(21) Appl. No.: 12/291,900

(22) Filed: Nov. 14, 2008

(65) Prior Publication Data

US 2009/0126818 A1    May 21, 2009

Related U.S. Application Data

(60) Provisional application No. 61/004,073, filed on Nov. 21, 2007.

(51) Int. Cl.
*F16K 7/10* (2006.01)
(52) U.S. Cl. .......... 138/93; 138/92; 138/94; 123/198 D; 137/68.19; 137/68.23; 137/456
(58) Field of Classification Search .................... 138/92, 138/93, 94; 123/198 D; 137/68.19, 68.23, 137/225, 456, 624.27, 797
See application file for complete search history.

(56) References Cited

U.S. PATENT DOCUMENTS

| | | | |
|---|---|---|---|
| 1,946,138 A * | 2/1934 | Gardner | 138/93 |
| 2,108,068 A * | 2/1938 | Larry | 251/190 |
| 2,801,026 A * | 7/1957 | Fruendt | 441/96 |
| 2,978,029 A * | 4/1961 | O'Reilly et al. | 166/63 |
| 3,044,479 A * | 7/1962 | Meyer et al. | 137/68.23 |
| 3,148,671 A | 9/1964 | Bottorff et al. | |
| 3,153,403 A | 10/1964 | Dobbs | |
| 3,202,143 A | 8/1965 | Goodwin | |
| 3,202,161 A | 8/1965 | Richards | |
| 3,523,521 A | 8/1970 | Goodwin | |
| 3,533,390 A | 10/1970 | Goodwin et al. | |
| 3,590,798 A | 7/1971 | Goodwin | |
| 3,768,497 A | 10/1973 | Mueller | |
| 3,853,110 A | 12/1974 | van der Merwe | |
| 3,877,455 A | 4/1975 | Goodwin | |
| 3,977,384 A | 8/1976 | Jahn | |
| 3,994,356 A | 11/1976 | Smitley | |
| 4,020,818 A | 5/1977 | Lesnick et al. | |
| 4,067,348 A | 1/1978 | Davis | |
| 4,080,946 A | 3/1978 | Cunningham | |
| 4,091,831 A | 5/1978 | Pazmany | |
| 4,117,822 A | 10/1978 | Mills | |
| 4,204,513 A | 5/1980 | Bilbrey et al. | |
| 4,367,705 A | 1/1983 | Oeth | |
| 4,399,785 A | 8/1983 | Mills | |
| 4,417,598 A * | 11/1983 | DePirro | 137/2 |
| 4,462,352 A | 7/1984 | Mills | |
| 4,476,825 A | 10/1984 | Mills | |
| 4,485,832 A | 12/1984 | Plemmons et al. | |
| 4,498,606 A | 2/1985 | DiRienzo | |

(Continued)

*Primary Examiner* — James Hook
(74) *Attorney, Agent, or Firm* — Sperry, Zoda & Kane

(57) ABSTRACT

An apparatus for rapidly terminating of the flow of any fluid or particulate material through a conduit responsive to predefined dangerous conditions. A particular application will terminate fuel flow through a large fuel supply conduit in a racing vehicle responsive to a fire or accident or other dangerous condition. The apparatus includes a gas supply source that is opened responsive to actuation of the apparatus such that gas passes into a cylinder which moves to force a liquid to hydraulically expand an inflatable member which is operative to expand within the flow conduit to instantaneously terminate material flow therethrough.

20 Claims, 7 Drawing Sheets

U.S. PATENT DOCUMENTS

| | | |
|---|---|---|
| 4,520,772 A | 6/1985 | Scott et al. |
| 4,616,806 A | 10/1986 | Davis |
| 4,844,113 A | 7/1989 | Jones |
| 5,076,321 A | 12/1991 | Terry |
| 5,131,433 A * | 7/1992 | Sion et al. ................ 138/93 |
| 5,209,252 A | 5/1993 | Perle |
| 5,400,752 A | 3/1995 | Madeley |
| 5,603,345 A | 2/1997 | Franklin et al. |
| 5,778,919 A * | 7/1998 | Petrone .................. 137/15.08 |
| 6,085,716 A | 7/2000 | Kampichler et al. |
| 6,085,772 A | 7/2000 | McGill et al. |
| 6,892,752 B2 * | 5/2005 | Burlock et al. ............. 137/317 |
| 2005/0229985 A1 * | 10/2005 | Saxenfelt .................... 138/93 |

* cited by examiner

APPARATUS FOR INSTANTANEOUSLY TERMINATING MOVEMENT OF FLOW MATERIAL THROUGH A CONDUIT

The present utility application hereby formally claims priority of U.S. Provisional Patent application No. 61/004,073 filed Nov. 21, 2007 on "APPARATUS FOR INSTANTANEOUSLY STOPPING MATERIAL FLOW THROUGH A CONDUIT" filed by the same inventors as listed herein, namely, Haskel Zeloof and James Vena, and assigned to the same assignee as herein, namely, Diversitech Inc., said referenced provisional application being hereby formally incorporated by reference as an integral part of the present application.

BACKGROUND OF THE INVENTION

1. Field of the Invention

The present invention provides an after market or original equipment apparatus for rapidly terminating the flow of any flowable material through a conduit. This apparatus is usable for quickly terminating the flow of corrosive, flammable or other dangerous materials through a conduit responsive to emergency conditions and is, particularly useful in applications for use in vehicles especially race cars, race boats, or other vehicles such as helicopters and the like. This apparatus is also particularly useful in chemical plants or paint plants or other similar applications where any transfer of bulk particulate materials such as fertilizer occurs.

Prior art devices have been utilized for terminating flow in such lines or conduits responsive to emergency conditions in which it is desired that the flow be instantly terminated for one reason or another. However, most such valves or flow restricting devices have an impact on flow during normal operating non-emergency conditions. The present invention provides a unique apparatus which minimizes the impact of the emergency flow termination device during normal operating conditions when fully positioned and ready for deployment. That is, when in place and ready to be deployed, the flow termination apparatus of the present invention does not significantly restrict or otherwise alter normal flow of material through the flow conduit. This characteristic is particularly useful where high volume or high speed flow through generally larger conduits is required such as in racing vehicles such as racing cars or racing boats, and, in particular, in high performance drag racing cars.

2. Description of the Prior Art

Many prior art devices have been utilized for quickly restricting or terminating material flow through conduits. These devices normally include different types of valves or other flow termination mechanisms which often have significant impact on normal flow. The present invention has a distinct advantage over these designs since the present invention does not significantly impact flow through the conduit during normal operating conditions. Also the present invention provides an unique apparatus operative such that when deployed, material flow is completely terminated in both directions instantaneously. This quick responsiveness is made possible by a design having a minimum number of moving parts which is impervious to the type of material flowing through the conduit flow line because it is isolated therefrom by a burst panel prior to deployment.

Although in the prior art there are many valves and flow restricting devices, the present invention provides a unique construction adapted specifically for instantaneous cessation of material flow through a conduit in a safe and convenient manner which is easily maintained and easy to deploy as opposed to many of the more complicated and more expensive prior art devices designed for this purpose. Examples of these prior art devices are shown in U.S. Pat. No. 3,148,671 issued Sep. 15, 1964 to F. Bottorff et al on a Fuel Control For Internal Combustion Engines; and U.S. Pat. No. 3,153,403 issued Oct. 20, 1964 to O. L. Dobbs on an "Engine Shut-Down System"; and U.S. Pat. No. 3,202,143 issued Aug. 24, 1965 to J. E. Goodwin and assigned to Sentinel Distributor, Inc. on "Pressure And Temperature Responsive Engine Shut-Down Devices"; and U.S. Pat. No. 3,202,161 issued Aug. 24, 1965 to G. P. Richards and assigned to Wagner Electric Corporation on an "Engine Safety Control Device And System"; and U.S. Pat. No. 3,523,521 issued Aug. 11, 1970 to J. E. Goodwin and assigned to Sentinel Distributors, Inc. on a "Pressure Responsive Engine Fuel Shutoff Device With Variable Shutoff Point"; and U.S. Pat. No. 3,533,390 issued Oct. 13, 1970 to J. E. Goodwin et al and assigned to Sentinel Distributors, Inc. on a "Protective Device For Engine Shutdown"; and U.S. Pat. No. 3,590,798 issued Jul. 6, 1971 to J. E. Goodwin and assigned to Sentinel Distributors, Inc. on an "Engine Safety Device Responsive To Abnormal Oil Pressure And Coolant Temperature Conditions"; and U.S. Pat. No. 3,768,497 issued Oct. 30, 1973 to W. L. Mueller on an "Emergency Gas Shut-Off Valve"; and U.S. Pat. No. 3,853,110 issued Dec. 10, 1974 to I. F. van der Merwe on an "Oil Pressure Detector"; and U.S. Pat. No. 3,877,455 issued Apr. 15, 1975 to J. E. Goodwin and assigned to Sentinel Distributors, Inc. on an Engine Protective System"; and U.S. Pat. No. 3,977,384 issued Aug. 31, 1976 to G. Jahn and assigned to Motorenund Turbinen-union Friedrichshafen GmbH on an "Internal Combustion Engine Oil Pressure Loss Safety Device"; and U.S. Pat. No. 3,994,356 issued Nov. 30, 1976 to M. L. Smitley and assigned to Colt Industries Operating Corporation on a "Safety Shut-Off Fuel System"; and U.S. Pat. No. 4,020,818 issued May 3, 1977 to G. Lesnick et al and assigned to Controlled Power Products Company on an "Oil Pressure Delay Check Valve And Pressure Switch For Shutting Off Diesel Engine Upon Drop In Oil Pressure"; and U.S. Pat. No. 4,067,348 issued Jan. 10, 1978 to B. G. Davis and assigned to Jetco, Inc. on a "Fuel Shut-Off Valve"; and U.S. Pat. No. 4,080,946 issued Mar. 28, 1978 to P. B. Cunningham and assigned to Lenmar Industries, Inc. on an "Internal Combustion Engine Shut-Down Control Valve"; and U.S. Pat. No. 4,091,831 issued May 30, 1978 to L. Pazmany on an "Emergency Shut-Off Valve"; and U.S. Pat. No. 4,117,822 issued Oct. 3, 1978 to J. T. Mills and assigned to Sentinel Distributors, Inc. on an "Engine Protective Device With Restricted Manual Override"; and U.S. Pat. No. 4,204,513 issued May 27, 1980 to R. A. Bilbrey et al and assigned to California Controls Company on an "Hydraulic Safety Mechanism"; and U.S. Pat. No. 4,367,705 issued Jan. 11, 1983 to J. F. Oeth and assigned to Deere & Company on a "Heat-Activated Fuel Shut-Off Valve Actuator"; and U.S. Pat. No. 4,399,785 issued Aug. 23, 1983 to J. T. Mills and assigned to Sentinel Manufacturing Company Incorporated on an "Engine Protective Device Responsive To Low Oil Pressure"; and U.S. Pat. No. 4,462,352 issued Jul. 31, 1984 to J. T. Mills and assigned to Sentinel Manufacturing Co., Inc. on an "Engine Protective Device Responsive To Low Oil Pressure"; and U.S. Pat. No. 4,476,825 issued Oct. 16, 1984 to J. T. Mills and assigned to Sentinel Manufacturing Company, Inc. on an "Engine Protective Apparatus With Remote Override"; and U.S. Pat. No. 4,485,832 issued Dec. 4, 1984 to J. R. Plemmons et al on an "Automatic Gas Shut-Off Valve"; and U.S. Pat. No. 4,498,606 issued Feb. 12, 1985 to A. DiRienzo on an "Emergency Fuel Flow Shut-Off Device"; and U.S. Pat. No. 4,520,772 issued Jun. 4, 1985 to W. A. Scott et al and assigned to Walbro Corporation on a "Fuel Shut-Off Valve For Internal Combustion Engines"; and U.S. Pat. No. 4,616,806 issued Oct. 14, 1986 to B. G. David and assigned to Jetco, Inc. on a "Valve"; and U.S. Pat. No. 4,844,113 issued Jul. 4, 1989 to C. R. Jones on a "Fluid Flow Safety Valve"; and U.S. Pat. No. 5,076,321 issued Dec. 31, 1991 to P. E. Terry on a "Flow Sensitive Fluid Shutoff Safety Device"; and U.S. Pat. No. 5,209,252 issued May 11, 1993 to C. B. Perle on an "Earthquake Gas Shut-Off Valve"; and U.S. Pat. No. 5,400,752 issued Mar. 28, 1995 to T. B. Madeley and assigned to Transerve (Proprietary) Limited on an "Engine Protection Valve"; and U.S. Pat. No. 5,603,345 issued Feb. 18, 1997 to R. Franklin et al and assigned to Pacific Enterprises on a "Retrofitable Safety Shut-Off Valve For Gas Or Liquid Meter"; and U.S. Pat. No. 6,085,716 issued Jul. 11, 2000 to G. Kampichler et al and assigned to Motorenfabrik Hatz GmbH & Co. on a "Device For Interrupting The Fuel Supply"; and U.S. Pat. No. 6,085,772 issued Jul. 11, 2000 to KJ. C. McGill et al on a "Smart Automatic Safety Valve Having Remote Electromagnetic, Shut-Off Protection And Reset Control From Seismic Or Other Sensors".

SUMMARY OF THE INVENTION

A novel apparatus is disclosed for the purpose of instantly causing the cessation of movement of a flow material from a first section of a material flow conduit toward a second section thereof. This apparatus is commonly used for instantaneously terminating the flow of fuels such as nitro methane or gasoline or other similar components from a gas tank to an engine in a race vehicle such as a drag racing car.

The construction includes a tubular mounting sleeve having a first sleeve end mounted longitudinally in alignment with respect to a first section of a material flow conduit. This first sleeve end is secured to the first section of the material flow conduit and is in fluid flow communication therewith. The tubular mounting sleeve also includes a second sleeve end mounted longitudinally in alignment with respect to a second section of the material flow conduit. The second sleeve end is secured to the second section of the material flow conduit and is in fluid flow communication therewith. With this construction blocking of the tubular mounting sleeve will operate to terminate fluid flow communication between the first and second portions of the material flow conduit for stopping the material flow therebetween.

The tubular mounting sleeve further includes a flow offset section extending laterally from a position along the tubular mounting sleeve between the first sleeve end and the second sleeve end. The flow offset section is in fluid flow communication with respect to the tubular mounting sleeve and with respect to the first and second mounting sections of the material flow conduit in such a manner that the cross-sectional flow area of the tubular mounting sleeve is not restricted at any point therealong in order to facilitate full flow between the first section of the material flow conduit and the second section of the material flow conduit prior to activation of the apparatus of the present invention. Furthermore, the flow offset section is preferably oriented approximately perpendicular with respect to the material flow path through the tubular mounting sleeve from the first section of the material flow conduit to the second section thereof. It should be appreciated that the flow offset section could be at any angle relative to the material flow path such as 45 degrees or any other angle.

A housing is included which is attached to the flow offset section of the tubular mounting sleeve. This housing includes a housing chamber defined therewithin with a housing inlet also defined therein in full fluid flow communication with respect to the housing chamber and being adapted to receive liquid materials passing thereinto. Preferably a liquid nozzle is positioned in the housing inlet in such a manner as to extend into the housing chamber to facilitate guiding of movement of liquid from the liquid line through the housing inlet into the housing chamber. The housing further defines an inflation opening in full fluid flow communication with respect to the housing chamber which is adapted to receive liquid materials passing therefrom. The housing is attached to the flow offset section of the tubular mounting sleeve with the inflation opening immediately thereadjacent.

An inflatable member is also included preferably made of a flexibly resilient rubber material which is mounted between the inflation opening and the flow offset section of the tubular mounting sleeve which at least partially extends through the inflation opening into the housing chamber prior to expansion thereof. The inflatable member is responsive to hydraulic force being exerted thereupon from within the housing chamber to inflate by expanding through the inflation opening to expand and deploy within the tubular mounting sleeve and terminate any flow exiting from the first sleeve end and traveling toward the second sleeve end and also to terminate any material flow from the first section of the material flow conduit toward the second section thereof. The inflatable member is at least partially collapsed immediately adjacent the inflation opening prior to activation of the gas release mechanism to facilitate movement of the inflatable member into the tubular mounting sleeve and to facilitate deployment of the inflatable member therewithin. The inflatable member is collapsed into a U-shaped cross-sectional configuration immediately adjacent the inflation opening prior to activation to facilitate movement of the inflatable member into the tubular mounting sleeve and to facilitate deployment of the inflatable member therewithin.

The inflatable member preferably includes an outer mounting rim fixedly mounted between the flow offset section and the housing immediately surrounding the inflation opening to facilitate positioning of the inflatable member and also to act as an O-ring shaped gasket therebetween. Furthermore the inflatable member also includes an inner collapsed section positioned within the inflation opening and within the housing chamber means prior to activation to facilitate deployment thereof within the tubular mounting sleeve after activation.

A burst panel is also included preferably formed of a thermoplastic material such as polytetrafluoroethylene also known by the trademark TEFLON. The burst material is positioned between the inflatable member mounted adjacent and extending across the inflation opening of the housing and the flow offset section of the tubular mounting sleeve. It is operative to prevent fluid flow therebetween. The burst panel is frangible responsive to force being exerted thereagainst by the inflatable member to fracture and allow the inflatable member to expand through the inflation opening means to facilitate inflation of the inflatable member within the tubular mounting sleeve responsive to the flow of liquid under hydraulic pressure thereinto from the housing chamber. The plane of the burst panel extends approximately parallel with respect to the directional flow material through the material flow conduit and through the tubular mounting sleeve.

A liquid line is included in fluid flow communication with respect to the housing inlet for supplying liquid thereto under hydraulic pressure. A liquid injecting cylinder is included having preferably a glycol and a fire retardant component added to the liquid contained therewithin. This liquid injecting cylinder includes a cylinder chamber defined therewithin and a piston positioned within the cylinder chamber and movable therewithin between an initial steady state position and a final activated position. The piston includes a piston gas side and a piston liquid side oppositely positioned on the piston from the piston gas side. Furthermore the liquid injecting cylinder includes a cylinder inlet end for receiving gas under pressure therethrough. The cylinder inlet end is in fluid flow communication with respect to the cylinder chamber adjacent the gas side of the piston to facilitate powering of movement thereof toward the final activated position responsive to pressurized gas passing therethrough. Furthermore included is a cylinder outlet end for receiving liquid under hydraulic pressure therethrough. This cylinder outlet end is preferably in fluid flow communication with respect to the liquid line to supply liquid thereto under hydraulic pressure from within the cylinder chamber means adjacent the piston liquid side responsive to movement of the piston from the initial steady state position toward the final activated position.

The apparatus of the present invention further includes a gas cartridge containing preferably pressurized nitrogen therein which is positioned selectively in fluid flow communication with respect to the cylinder inlet end of the liquid injecting cylinder to supply gas under pneumatic pressure therethrough for exerting pneumatic pressure against the piston gas side for urging movement of the piston from the initial steady state position toward the final activated position.

Also included in the present invention is a gas release mechanism operatively mounted between the gas cartridge and the liquid injecting cylinder. This gas release mechanism is operative to open the gas cartridge for facilitating supplying of gas under pressure therefrom through the cylinder inlet end of the liquid injecting cylinder responsive to sensing of a dangerous condition requiring termination of movement of flow material from the first sections of the material flow conduit to the second section thereof. The gas release mechanism can further preferably include a tamper-resistant safety pin extending therethrough to prevent activation unless removed.

A thermoplastic biasing member is preferably included which is generally round or ball shaped and is preferably positioned within the inflatable member when collapsed in the U-shaped configuration prior to deployment thereof to facilitate the exerting of hydraulic pressure against the burst panel to minimize vibration thereof. The thermoplastic biasing member is positioned adjacent the inflatable member prior to deployment thereof to facilitate exerting of hydraulic pressure against the burst panel to minimize vibration thereof and wherein the liquid nozzle is positioned in abutment with the biasing member to facilitate biasing thereof against the inflatable member.

It is an object of the apparatus of the present invention to instantaneously stop material flow through a conduit while remaining impervious to the attitude or the orientation in the positioning thereof.

It is an object of the apparatus of the present invention to instantaneously stop material flow through a conduit which can be used for stopping the flow of any liquids or other forms of media including plastic beads, powder, particulate materials or any similar material that has the capacity to flow through a line and, specifically, certainly including internal combustion engine fuels such as gasoline, nitro-methane and alcohol or any mixture thereof.

It is an object of the apparatus of the present invention to instantaneously stop material flow through a conduit which isolates the inflation liquid from all the active parts of the device prior to activation and subsequent to activation.

It is an object of the apparatus of the present invention to instantaneously stop material flow through a conduit which is reusable and fully serviceable to subsequent usages, but only when serviced by a service technician.

It is an object of the apparatus of the present invention to instantaneously stop material flow through a conduit which can include a fire suppression component such as foam or the like within the inflating liquid that is useful if the inflatable is compromised.

It is an object of the apparatus of the present invention to instantaneously stop material flow through a conduit which can be activated by a cable responsive to movement of a crash rod, chassis failure, or operation of an electric solenoid which can be attached to a sensor for sensing any type of vibration or G-force over a given positive or negative threshold or be responsive to the sensing of heat or merely be remotely operated through a radio controlled transmitter.

It is an object of the apparatus of the present invention to instantaneously stop material flow through a conduit which utilizes a pressurized gas source comprising primarily nitrogen for powering movement of an inflating piston in order to be less affected by temperature, pressure or altitude variations readily apparent with other pressurized gases.

It is an object of the apparatus of the present invention to instantaneously stop material flow through a conduit despite slight variations in the pressure at which pressurized gas is supplied to initiate activation or slight variations of the volume of gas so supplied.

It is an object of the apparatus of the present invention to instantaneously stop material flow through a conduit which is fully operative with fuel lines of various dimensions and is particularly useful with fuel lines of larger diameters such as approximately two inches in diameter or slightly greater or slightly smaller.

It is an object of the apparatus of the present invention to instantaneously stop material flow through a conduit which can include an inflating driving piston and a gas cartridge and gas flow lines that can be positioned remotely from the other portions of the apparatus, if desired, for various applications to facilitate remote control thereof for safety or other considerations.

It is an object of the apparatus of the present invention to instantaneously stop material flow through a conduit which includes a polytetrafluoroethylene also known by the trademark TEFLON disk which operates as a burst panel to protect the material of the inflatable member from the flowing media prior to deployment thereof.

It is an object of the apparatus of the present invention to instantaneously stop material flow through a conduit which can easily be retrofitted into the fuel lines of an existing fuel delivery systems for facilitating use thereof with various vehicles, particularly with racing vehicles.

It is an object of the apparatus of the present invention to instantaneously stop material flow through a conduit which is operative to maintain closure against material flow for a time period after actuation thereof which is far greater than the time period during which the flow environment will be subjected to emergency conditions.

It is an object of the apparatus of the present invention to instantaneously stop material flow through a conduit which is operative to maintain permanent closure against material flow after actuation thereof until manually removed by servicing personnel.

It is an object of the apparatus of the present invention to provide an apparatus for instantaneously stopping material flow through a conduit which is extremely light in weight and easy to install.

It is an object of the apparatus of the present invention to provide an apparatus that can instantaneously stop material flow through a conduit which can include tamper-resistant seals to detect unauthorized disassembly or accessing of the housing, fittings or hoses.

It is an object of the apparatus of the present invention to instantaneously stop material flow through a conduit which effectively creates a positively engaged mechanical seal formed by inflation of a carefully pre-positioned inflatable member or bladder.

It is an object of the apparatus of the present invention to instantaneously stops material flow through a conduit which is impervious to vibrations.

It is an object of the apparatus of the present invention to instantaneously stop material flow through a conduit which is compact and has a low overall profile.

It is an object of the apparatus of the present invention to instantaneously stop material flow through a conduit which can include a safety device such as a tamper-resistant pin that needs to be removed in order to allow full deployment thereof.

It is an object of the apparatus of the present invention to instantaneously stop material flow through a conduit which can include glycol as a component of the inflating liquid for the purpose of preventing unwanted freezing thereof.

It is an object of the apparatus of the present invention to instantaneously stop material flow through a conduit which is operative to be irreversibly deployed to maintain flow termination until manually serviced.

It is an object of the apparatus of the present invention to instantaneously stop material flow through a conduit which is particularly useful with larger fuel conduits as large as two inches in diameter or larger.

It is an object of the apparatus of the present invention to instantaneously stop material flow through a conduit which can be used with a flow conduit of any diameter.

It is an object of the apparatus of the present invention to instantaneously stop material flow through a conduit which allows full unrestricted flow through the flow conduit prior to deployment thereof.

It is an object of the apparatus of the present invention to instantaneously stop material flow through a conduit which is isolated from the external environment to facilitate the capability for full operation thereof even when submersed underwater.

It is an object of the apparatus of the present invention to instantaneously stop material flow through a material flow conduit that is non-directional, that is, where flow is stopped in both directions responsive to activation thereof.

BRIEF DESCRIPTION OF THE DRAWINGS

While the invention is particularly pointed out and distinctly described herein, a preferred embodiment in set forth in the following detailed description which may be best understood when read in connection with the accompanying drawings, in which.

DETAILED DESCRIPTION OF THE PREFERRED EMBODIMENT

Figure 1:
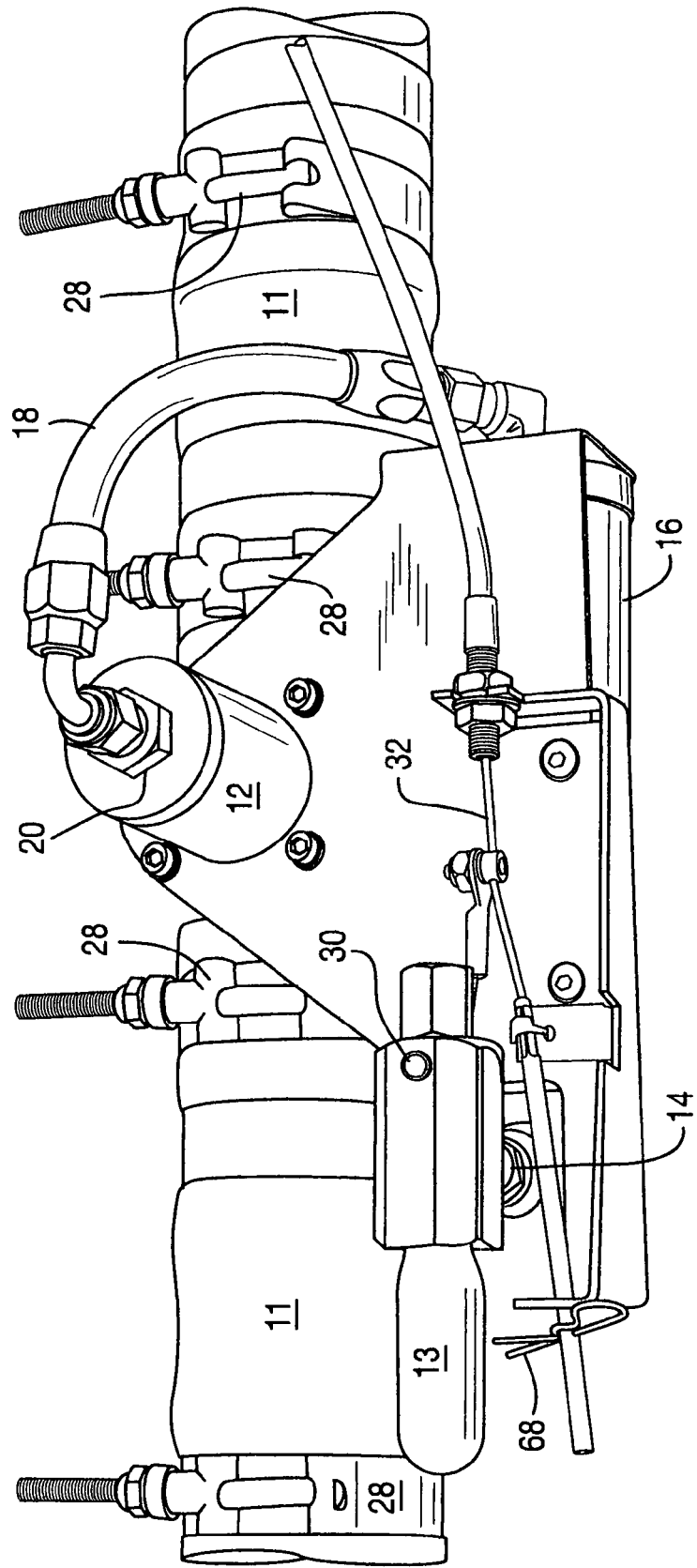
FIG. 1 a top plan/perspective view of an embodiment of the apparatus for instantaneously stopping material flow through a conduit of the present invention.

The present invention provides a unique apparatus which is designed specifically for instantaneously terminating material flow through a conduit in a safe and efficient manner while also being usable with great variety of different types of flow materials. In order to install the apparatus of the present invention, a user must cut or otherwise remove a short section from a conventional material flow line such as a fuel flow line 10. This removal will form a first fuel line section 60 separated by a second fuel line section 62 by the length of the removed section. The user will then place the tubular mounting sleeve in position extending between the first fuel line section 60 and the second fuel line section 62. In particular, the user will connect the first sleeve section 64 to the first fuel line section 60 and will place the second sleeve section 66 in engagement with respect to the second fuel line section 62. In this manner the tubular mounting sleeve will be positioned in line and within the fuel line 10. Preferably the inside diameter of the sleeve 11 will be equal to or greater than the inside diameter of the fuel line 10 such that there will be no flow restrictions resulting from placement of the mounting sleeve 11 in series in the fuel line.

Particularly, as shown in the present embodiment, the present application can be usable with larger fuel lines 10 designed to carry large volumes of fuel for vehicles such as racing vehicles. Such vehicles are commonly exposed to dangerous dynamic conditions that can result in serious malfunctions resulting in the release of excessive amounts of fuel. Such a fuel release is dangerous and can cause extensive damage which sometimes result in serious injury to nearby personnel, particularly to the vehicle driver. This preferred embodiment of the present invention provides an apparatus for terminating the flow of fuel instantaneously responsive to experiencing such emergency conditions such as a racing vehicle accident or other serious malfunction.

Figure 10:
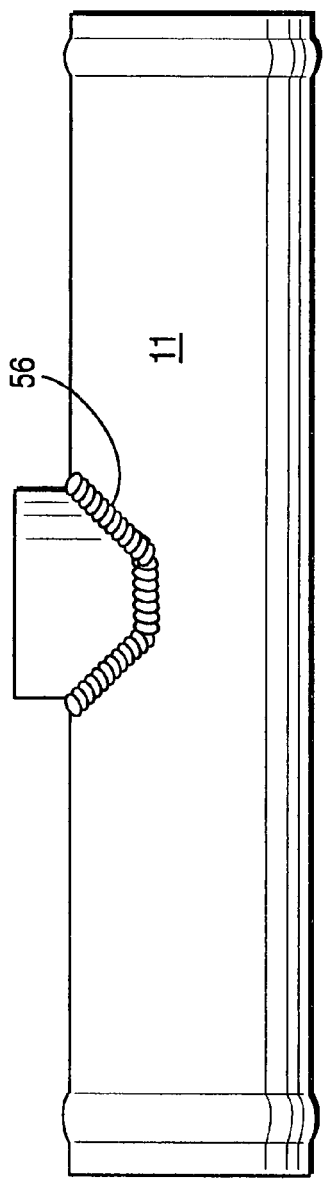
FIG. 10 is a side plan view of an embodiment of the tubular mounting sleeve and flow offset section of the present invention.

This embodiment of the apparatus of the present invention includes a tubular mounting sleeve 11 adapted to be positioned within the flow path of the fuel line 10. During aftermarket installation, a section of the fuel line 10 is removed to allow positioning of the apparatus of the present invention in series within the fuel line 10 to facilitate operation thereof to terminate material or fuel flow instantaneously responsive to emergency conditions such as a vehicle accident or fire. Of course, this apparatus can also be used as an originally installed equipment. The tubular mounting sleeve 11, preferably, includes a flow offset section 40 in fluid flow communication with respect to the interior of the fuel line 10 but offset therefrom. Preferably the flow offset section 40 is attached to the tubular mounting sleeve 11 by welding such as shown by the welding line displayed FIG. 10. In this manner the full flow characteristics of the entire diameter of the fuel line 10 and tubular mounting sleeve 11 is fully maintained while still allowing termination of full material flow by the apparatus of the present invention which instantaneously stops material flow if necessary.

The apparatus of the present invention includes a housing 12 which houses some of the supply of liquid designed to inflate an inflatable member 21 which can deploy within the tubular mounting sleeve 11 to fully block material flow therethrough. A housing 12 and the liquid injecting cylinder 16 provide the main reservoir of the inflating liquid along with the liquid lines 18 extending therebetween and the portion of the cylinder 16 downstream from piston 50.

The present invention is operated by a releasing cable 32 which is preferably mounted within a releasing cable housing 34. This cable 32 can extend to various vehicle locations and will be operative responsive to pulling thereon to activate the material flow blocking apparatus of the present invention. The means of operation or pulling of this releasing cable 32 can be caused by sensing of a variety of different dangerous conditions. For example, the releasing cable can be positioned extending between various different sections of the vehicle such that if the vehicle breaks apart during an accident and once of the points of cable connection separates from another of the cable connection points then the vehicle the fuel flow terminating device will be instantly activated. The releasing cable 32 could also be manually operated or can be connected to a solenoid or other electrical device which can monitor various parameters and, thus, can be operative responsive to excessive temperature or unusual vibrations or any other conditions deemed to be dangerous enough that fuel flow should be terminated. Also, it is possible that the mechanism can be remotely operated by a remote controlled operation device such as a radio controlled transmitter for certain applications.

The apparatus of this embodiment of the present invention includes a gas cartridge or canister 13. Also a gas release mechanism 30 is operatively mounted to cartridge 13. When the apparatus of the present invention is activated, the gas release mechanism 30 will be caused to operate to open the gas supply cartridge 13 to allow the compressed gas therewithin to exit therefrom.

Gas cartridge 13 is positioned in fluid flow communication with a gas line or conduit 14 which is also in fluid flow communication with respect to the inlet end cylinder port 46 of a liquid injecting cylinder 16. Liquid injecting cylinder 16 defines a cylinder chamber therewithin with a piston 50 moveably mounted therein. The side of the piston 50 closest to the inlet cylinder end 46 is defined as the piston gas side 54. The side of the piston 50 closest to the outlet cylinder end 48 is defined as the piston liquid side 55. When gas exits from gas cartridge 13, it will travel under pressure through gas conduit 14 into the liquid injecting cylinder through the inlet cylinder end 46 thereof. Preferably the gas contained within the gas cartridge 13 is nitrogen since nitrogen is less responsive to variations in temperature, pressure and altitude or other environmental conditions than would be other gases such as air, carbon dioxide or others.

Thus, in this embodiment, the operation of the releasing cable 32 will cause the gas cartridge 13 to start to supply pressurized nitrogen or other gas through the gas conduits 14 which can comprises lines or fittings or any other conduits.

Figure 11:
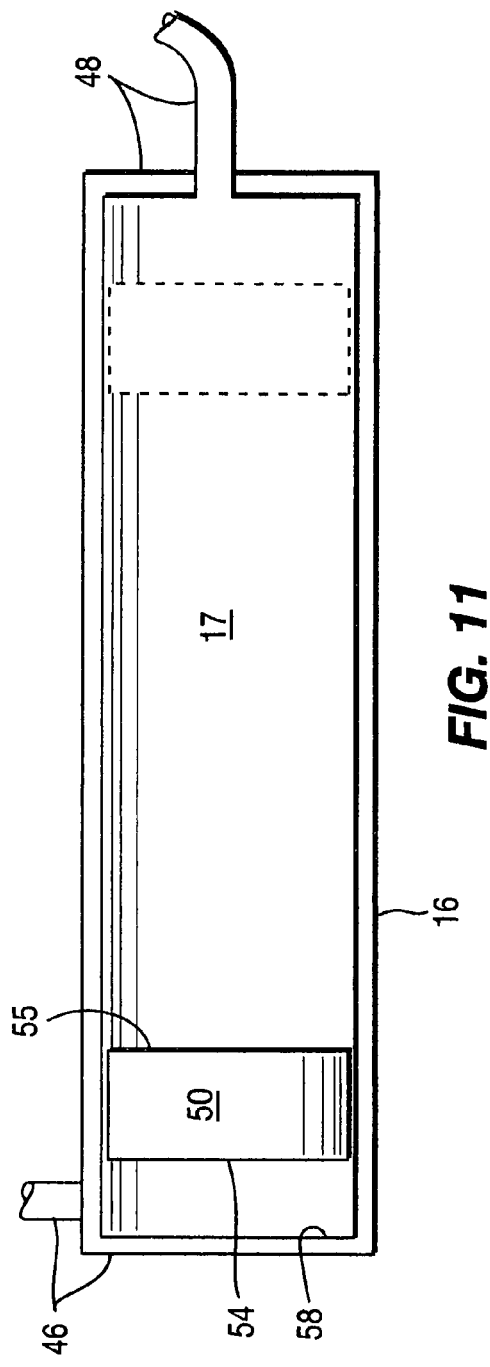
FIG. 11 is a side cross-sectional illustration of an embodiment of the liquid injecting cylinder of the present invention showing the piston in the initial steady state position prior to activation displayed in full lining and showing the piston in the final state position after to activation displayed in phantom lining.

Liquid injecting cylinder 16 contains a piston 50 therewithin. Piston 50 is movable between the outlet cylinder end 48 of cylinder 16 and the inlet end 50 thereof. Piston 50 is initially positioned in the steady state position adjacent the inlet end 50 thereof prior to release of gas by gas cartridge 13 as shown in FIG. 11. In this initial steady state position the liquid injecting cylinder 16 will be filled with liquid from the piston 50 completely to the outlet cylinder end 48.

The outlet cylinder end 48 of cylinder 16 provides an exit port for the exiting of liquid positioned within the cylinder 16 between the piston 50 and the outlet cylinder end 48. Outlet cylinder end 48 is connected to liquid lines 18 which extend further to a housing inlet 20 defined in housing means 12. In the initial steady state position prior to activation of the gas release mechanism, liquid 58 is contained within the cylinder 16 between piston 50 and the inlet cylinder end 46 thereof as well as within liquid lines 18 and the housing means 12.

Movement of the piston 50 within the cylinder 16 is powered by the gas released from the gas cartridge 13 which enters thereinto through the inlet cylinder end 46 thereof. This pressurized gas is operative to move the piston 50 from the steady state position adjacent the inlet cylinder end 46 thereof to a final position adjacent the outlet cylinder end 48 thereof. While moving in this manner the piston 50 will cause the liquid initially located between the piston 50 and the outlet cylinder end 48 to exit the outlet end 48 of cylinder 16 such that the liquid will move through liquid lines 18 toward housing 12.

The liquid lines are attached to the housing inlet 20 such that the liquid can move therethrough into the housing chamber 22 defined within the housing means 12. The housing chamber 22 includes an inflatable member 21 positioned therewithin which is adapted to be inflated responsive to the flow of liquid into housing chamber 22 beyond the capacity thereof.

As such, since the liquid will be positioned within the housing chamber 22 in the housing 12 as well as within all of the liquid lines 18 as well as within the liquid injecting cylinder 16 on the downstream side of the piston located therewithin, the inflation of the inflatable member 21 will be initiated immediately responsive to the piston 50 starting movement from the initial steady state position adjacent the inlet cylinder end 46 toward the outlet cylinder end 48. In other words, exposure of the piston 50 in the liquid injecting cylinder 16 to the pressurized nitrogen gas 14 at the inlet cylinder end 46 will cause the piston to move in such a manner as to urge the inflating liquid located within the liquid injecting cylinder 16 to exit therefrom through the outlet cylinder end 48 and move through the liquid lines 18 and through the housing inlet 20 into the housing chamber 22. Thus, pressure will be exerted upon the liquid in housing chamber 22 which will cause a significant amount of hydraulic pressure to be exerted against the inflatable member 21 to facilitate deployment thereof.

In the initial configuration of the apparatus of the present invention the inflating member 23 is at least partially collapsed and is positioned within an inflating opening 52 defined in the housing 12. The inflating opening 52 is positioned immediately adjacent to a flow offset section 40 defined immediately adjacent to the tubular mounting sleeve 11 through which fuel flows. The flow offset section 40 is laterally disposed from the flow path of fuel through the tubular mounting sleeve such that the apparatus of the present invention does not in any manner whatsoever restrict the normally speed and volume of fuel flow through fuel lines 10 and tubular mounting sleeve 11.

A burst panel 26 is positioned extending across the inflating opening means 52 for the purpose of isolating the operating parts of the apparatus of the present invention from the material flowing through the fuel line 10 and the tubular mounting sleeve 11. Burst panel 26 is preferably made of a thermoplastic material having a very low coefficient of surface friction and being structurally strong enough to maintain this seal such as currently being manufactured and sold under the trademark polytetrafluoroethylene also known by the trademark TEFLON or other similar material. When hydraulic pressure is exerted internally within the housing chamber 22 the liquid will expand the collapsed inflatable member 23 in a direction outwardly through the inflating opening means 52. The force of outward expansion of the inflatable member 23 will cause the burst panel 26 to rupture which will allow the inflatable member 21 to expand further outwardly through the flow offset section 40 into the interior of the tubular mounting sleeve 11. This rupture will allow the inflatable member 21 to pass directly into the interior of the tubular mounting sleeve 11 and expand against the interior walls thereof to terminate any material or fuel flow therethrough.

Preferably the inflatable member 21 will be made of a flexibly resilient material or rubber material such that it is more easily expandable and can form a balloon or ball shape or generally round shape within the tubular mounting sleeve 11 after it passes beyond the original location of the burst panel 26. This generally round shape will be very effective to facilitate complete sealing of the interior of the sleeve 11 to prevent flow therethrough.

Figure 3:
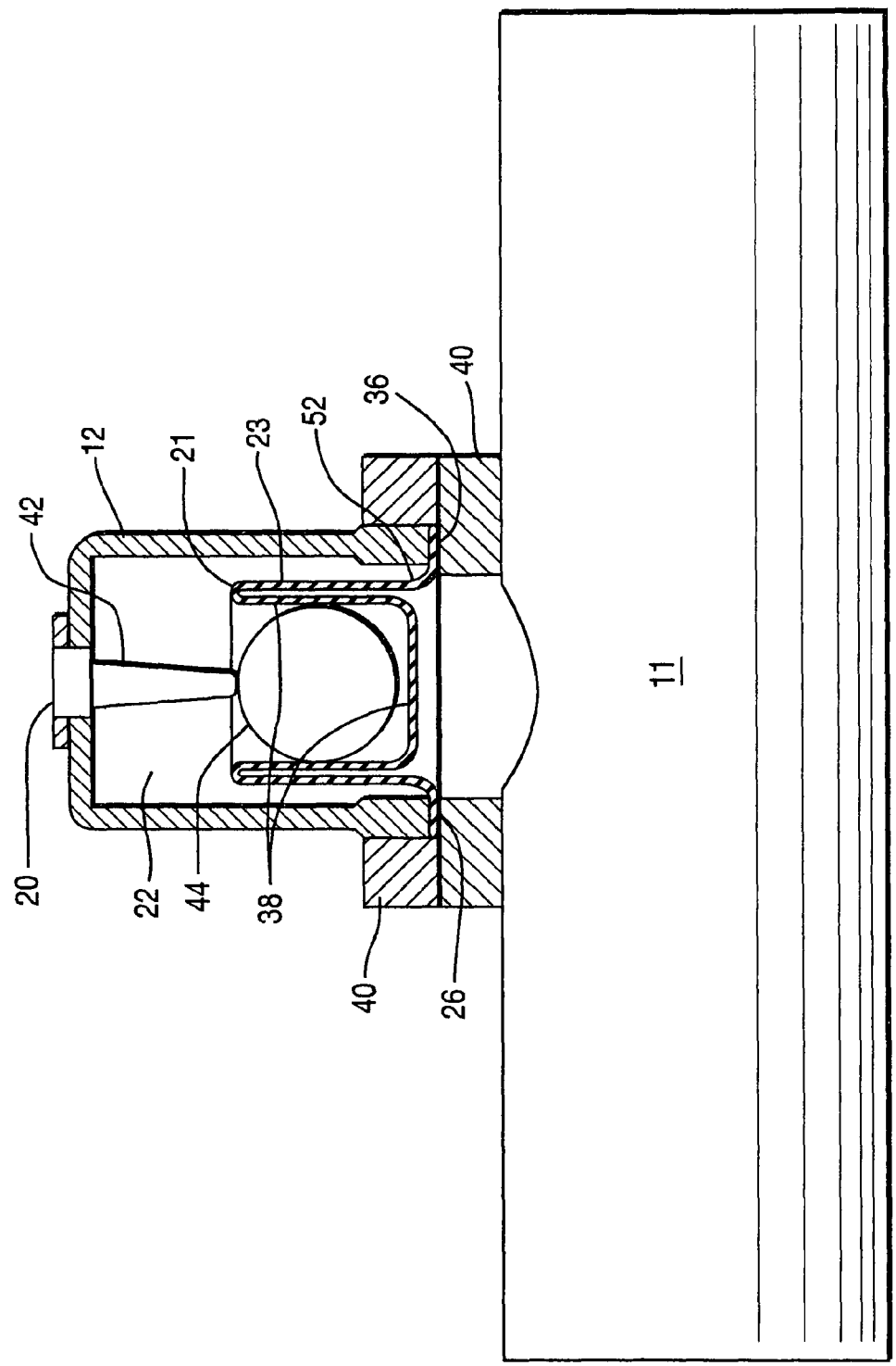
FIG. 3 is a cross-sectional view of an embodiment of the apparatus of the present invention showing the housing attached with respect to a fuel line and clearly illustrating the inflatable member in the collapsed position prior to deployment.
Figure 4:
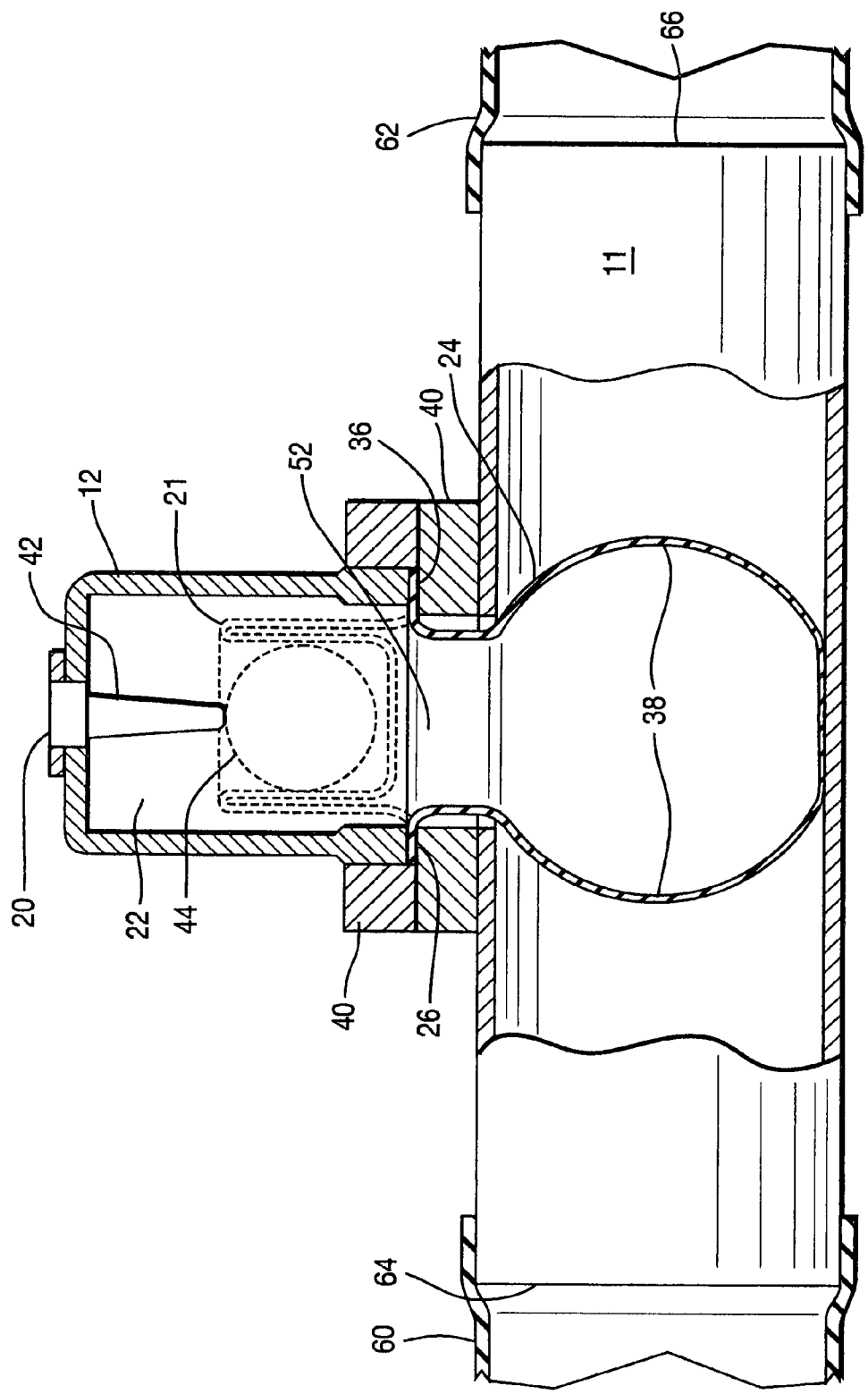
FIG. 4 is an illustration of the embodiment shown in FIG. 3 wherein the inflatable member is shown in the expanded position blocking material flow through the main conduit.

The position of the inflatable member 23 prior to full deployment is shown best in FIG. 3. The position of the inflatable member after full deployment is shown best in FIG. 4. As shown in FIG. 4 the inflatable member 23 when deployed can assume a generally round shape which will effectively block any material flow through the line 10 by sealing tubular mounting sleeve 11 even in those situations where either the line 10 or sleeve 1 might be damaged and misshapen.

Figure 5:
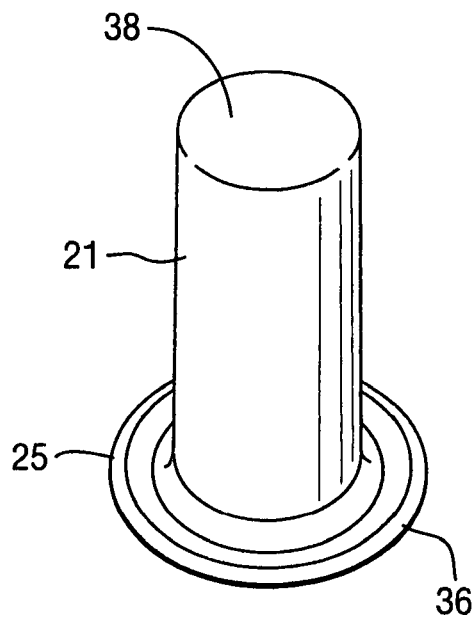
FIG. 5 is a top plan view of an embodiment of an inflatable member of the present invention as manufactured prior to folding for packing in the apparatus of the present invention.
Figure 6:
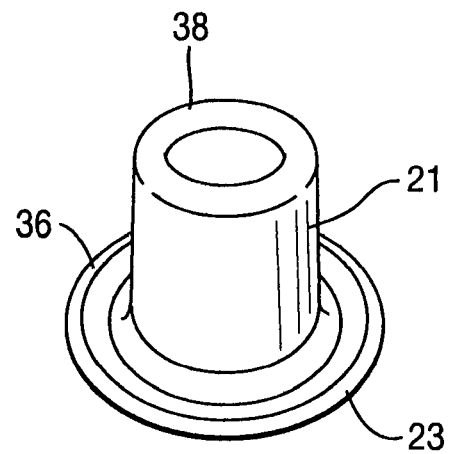
FIG. 6 is an illustration of the embodiment of the inflatable member of FIG. 5 shown in the packed position ready for assembly.
Figure 7:
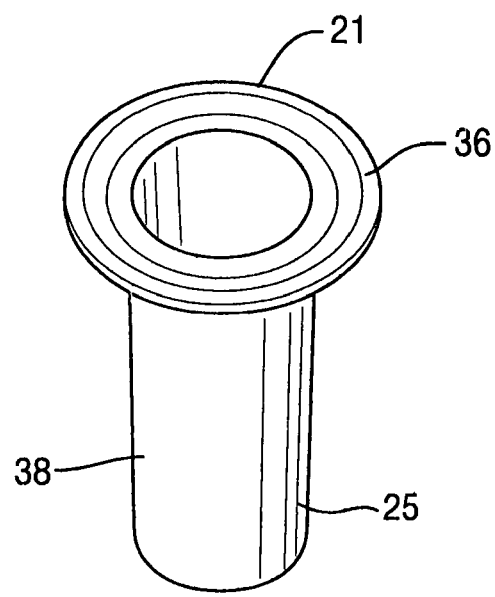
FIG. 7 is a bottom plan view of the embodiment shown in FIG. 5.
Figure 8:
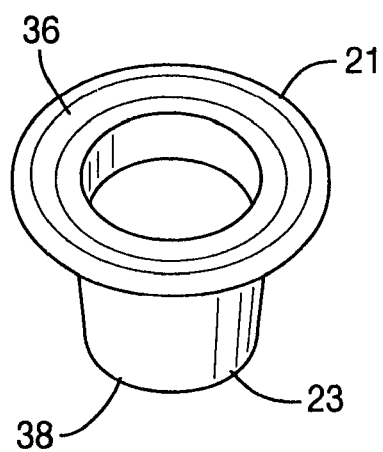
FIG. 8 is a bottom plan view of the embodiment shown in FIG. 6.
Figure 9:
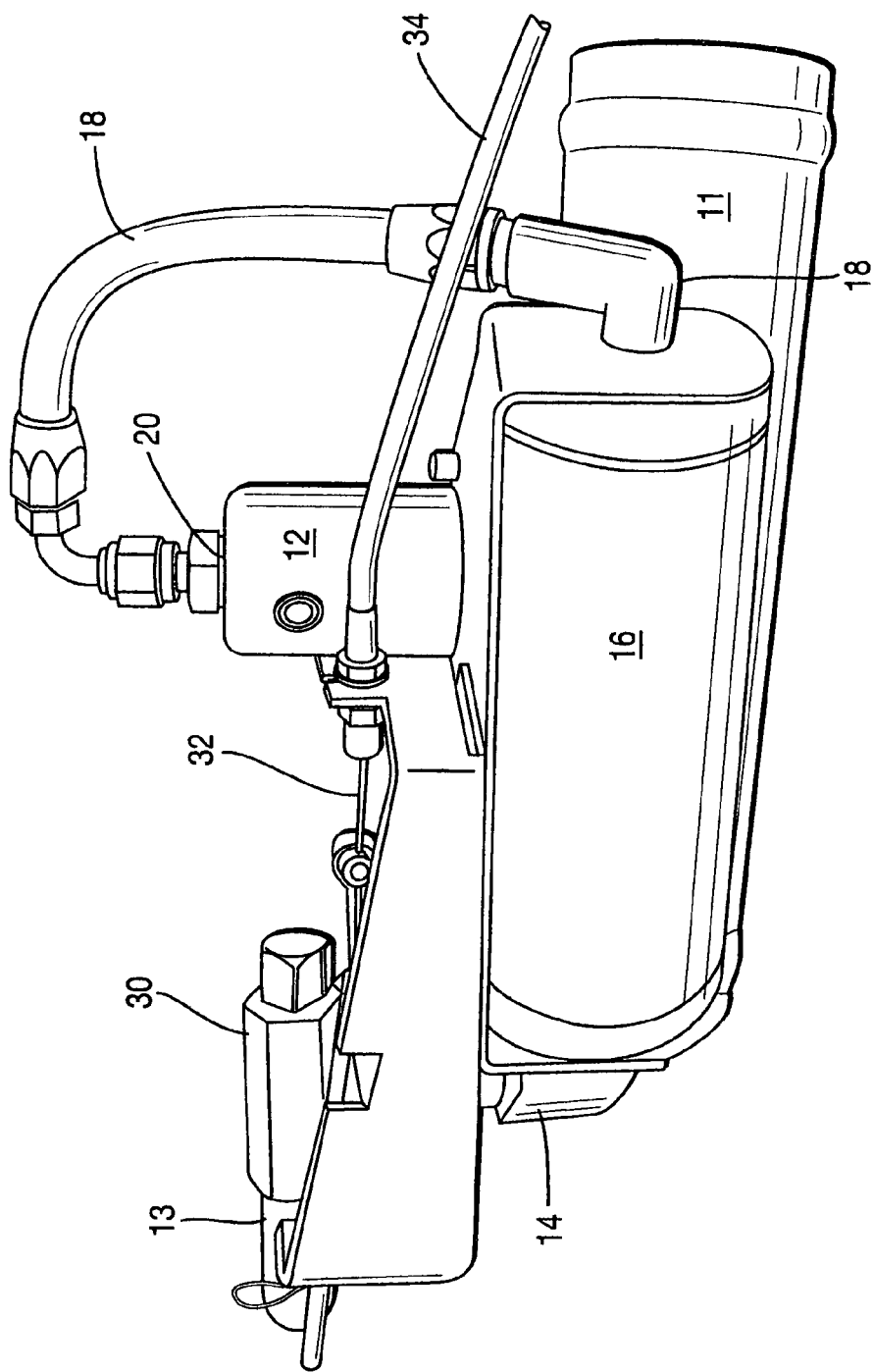
FIG. 9 is a side perspective illustration of an embodiment of the apparatus of the present invention for instantaneously stopping material flow through a conduit.

FIG. 5 shows an illustration of the inflatable member as initially provided. This inflatable member is collapsible into the configuration shown in FIG. 6 such that it is ready to be loaded within the apparatus of the present invention. FIG. 7 is a bottom plan view of the FIG. 5 configuration and FIG. 8 is a bottom plan view of the FIG. 6 configuration. Thus, when the inflatable member 23 is loaded into the apparatus of the present invention, it is in the collapsed configuration shown in FIGS. 6 and 8 and is loaded in a position as shown in FIG. 3. The inflatable member includes an outer mounting rim 36 which facilitates retaining of the inflatable member in position between the housing 12 and the flow offset section 40 of the tubular mounting sleeve 11 and also acts as a sealing O-ring therebetween. When the liquid within the housing chamber 22 is hydraulically pressurized by the movement of the piston 50, the inflatable member 23 will move to the inflated position as shown in FIG. 4. This inflation is facilitated because the portion of the inflatable member 23 centrally located within the outer mounting rim 36 is an the inflatable inner section 38. Inflatable inner section 38 can expand into a generally round or ball shape and thereby block the flow of any material through the tubular mounting sleeve 11 or line 10 while at the same time the outer mounting rim 36 of the inflatable member 23 is held fixedly in the originally loaded position wedged between the portion of housing 12 surrounding inflating opening 52 and the flow offset section 40 of tubular mounting sleeve 11.

With this construction, once the inflatable inner section 38 of the inflatable member 23 is fully deployed it will remain deployed throughout the entire term of the emergency situation or until it is manually serviced by a technician. In order to terminate deployment it will be necessary to remove the unit from the fuel line such that it can be re-loaded and re-packed in a convenient and efficient manner by the service personnel which is expected to be made conveniently available at a reasonable price.

Figure 2:
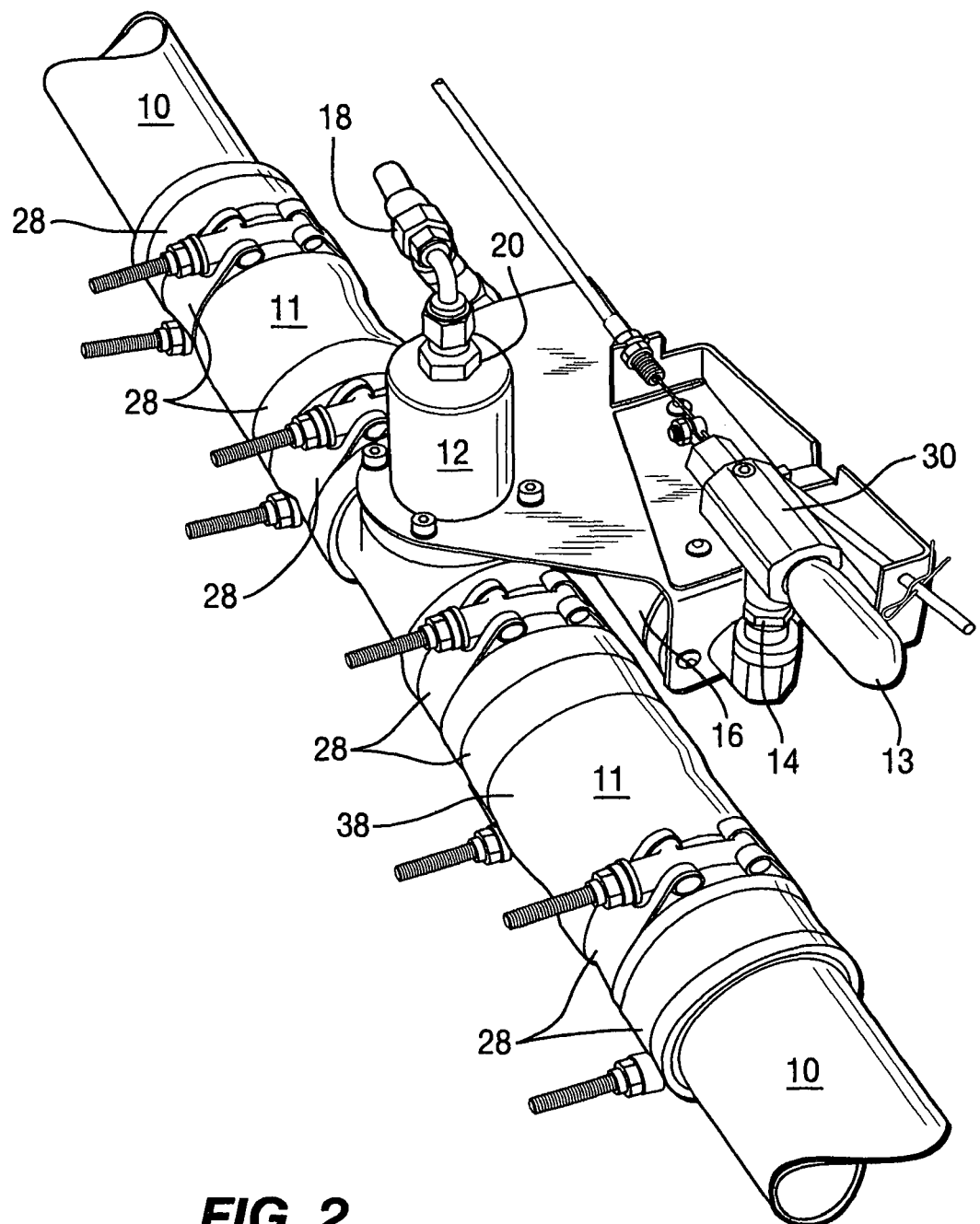
FIG. 2 is a three-quarter side perspective of an embodiment of the apparatus shown in FIG. 1.

As shown in FIGS. 1 and 2 mounting of the apparatus of the present invention relative to the fuel line 10 is enhanced by the inclusion of a plurality of pipe clamps 28 extending around each opposite end of the tubular mounting sleeve 11.

The shape of the inflatable member as originally formed is shown by reference numeral 25 in FIGS. 5 and 7. This shape is not acceptable for loading and the inflatable member shoulder be folded to the configuration shown in FIGS. 6 and 8 for loading within the housing 12 at a position adjacent to the inflating opening 52 ready to be deployed.

The inflatable member is preferably made of an inert flexible material which is resistant to various fuels, materials and medias with which it will come in contact with. Since it will block and be in contact with the flowing material for a significant period of time, it is important that the material be impervious to the various types of flowing materials such that a complete seal will be maintained until serviced. One of the most dangerous of these materials is nitro methane and racing alcohol fuels such as methanol and it is important that this embodiment of the present invention make use of a rubber-type material for the inflatable member which does not in any way deteriorate when exposed to these types of fuels.

It is important to appreciate that the embodiment described herein above is designed specifically for usage with a fuel delivery system of a high performance racing vehicle. However, the apparatus of the present invention has more general applications since it can be used to stop the flow of any flowable material which includes any fluids or particulate materials such as plastic beads, powder, particulate material, fertilizer or any material that could conceivably flow through a conduit or line. It is also important to note that all operative portions of the apparatus of the present invention are isolated from the material flowing through the line 10 and sleeve 11 other than the polytetrafluoroethylene also known by the trademark TEFLON burst panel 26 which is designed to be impervious to any material flowing therethrough particularly including gasoline, alcohol or nitro methane.

The apparatus of the present invention is fully reusable if serviced after deployment such that it can be used again as a safety device to provide the capability of instantaneously terminating the flow of any material through the flow conduit.

It should be appreciated that glycol can be positioned within the inflating liquid of the apparatus of the present invention to prevent freezing thereof and facilitate usage of the flow interruption device of the present invention under low temperature conditions.

An important consideration of the present invention is that the cross-section of flow through the fuel line is not in any way effected by the usage of this flow stopping apparatus. That is, there is no restriction of material or fuel flow through the fuel line 10 or the tubular mounting sleeve 11 during non-emergency conditions prior to deployment of the apparatus of the present invention. Most valves or flow termination devices do include some level of flow restriction even when in the full flow position. The present invention has the capability of instantaneously terminating all flow responsive to activation even though the flow during the steady state condition prior to experiencing any emergency conditions is unaffected.

To further facilitate operation of the apparatus of the present invention, it is advisable to include a biasing member 44 such as a thermoplastic ball located within the housing means 12 at a position within the collapsed inflatable member 23. Also housing 12 will preferably include a nozzle to facilitating directing the liquid 58 flowing into housing 12 from liquid lines 18. This configuration is best shown in FIG. 3. The biasing ball will rest against the collapsed portion of biasing member 44 prior to inflation thereof to facilitate urging thereof into abutment with the interior surface of the burst panel 26. This force exerted against burst panel 26 will prevent unwanted vibration or other movements thereof during normal material flow through the tubular mounting sleeve prior to activation of the apparatus of the present invention. This bias can be enhanced somewhat by sizing of the nozzle 42 and ball member 44 such that they are in abutment with respect to one another during the steady state position of the apparatus of the present invention prior to activation thereof.

FIG. 1 shows the inclusion of a tamper-resistant safety pin 68 included within the construction of the gas release mechanism 30 to prevent activation unless the pin has been fully removed initially.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An apparatus for instantaneously terminating movement of flow material from a first section of a material flow conduit toward a second section thereof, comprising:
   A) a tubular mounting sleeve including:
      (1) a first sleeve end mounted longitudinally in alignment with respect to a first section of a material flow conduit, said first sleeve end being secured to the first section of the material flow conduit and in fluid flow communication therewith;
      (2) a second sleeve end mounted longitudinally in alignment with respect to a second section of a material flow conduit, said second sleeve end being secured to the second section of the material flow conduit and in fluid flow communication therewith, blocking of said tubular mounting sleeve being operative to terminate material flow from the first portion of the material flow conduit toward the second portion thereof;
      (3) a flow offset section extending laterally from a position along said tubular mounting sleeve between said first sleeve end and said second sleeve end, said flow offset section being in fluid flow communication with respect to said tubular mounting sleeve and with respect to the first and second sections of the material flow conduit;
   B) a housing attached to said flow offset section of said tubular mounting sleeve, said housing including;
      (1) a housing chamber means defined therewithin;
      (2) a housing inlet means in full fluid flow communication with respect to said housing chamber means and adapted to receive liquid materials passing thereinto;
      (3) an inflation opening means in full fluid flow communication with respect to said housing chamber means and adapted to receive liquid materials passing therefrom, said housing being attached to said flow offset section of said tubular mounting sleeve with said inflation opening means immediately thereadjacent;
   C) an inflatable member mounted between said inflation opening means and said flow offset section of said tubular mounting sleeve and at least partially extending through said inflation opening means into said housing chamber means prior to expansion thereof, said inflatable member being responsive to hydraulic force being exerted thereupon from within said housing chamber means to inflate by expanding through said inflation opening means expand and deploy within said tubular mounting sleeve and terminate any flow therethrough from said first sleeve end toward said second sleeve end and also to terminate any material flow from the first section of a material flow conduit toward the second section thereof;
   D) a burst panel positioned between inflatable member mounted adjacent and extending across said inflation opening means of said housing and said flow offset section of said tubular mounting sleeve and being operative to prevent fluid flow therebetween, said burst panel being frangible responsive to force being exerted thereagainst by said inflatable member to fracture to allow said inflatable member to be expand through said inflation opening means to facilitate inflation of said inflatable member within said tubular mounting sleeve responsive to the flow of liquid under hydraulic pressure thereinto from said housing chamber means;
   E) a liquid line in fluid flow communication with respect to said housing inlet means for supplying liquid thereto under hydraulic pressure;
   F) a liquid injecting cylinder including:
      (1) a cylinder chamber means defined therewithin;
      (2) a piston positioned within said cylinder chamber means and movable therewithin between an initial steady state position and a final activated position, said piston including a piston gas side and a piston liquid side oppositely positioned on said piston from said piston gas side;
      (3) a cylinder inlet end for receiving gas under pressure therethrough, said cylinder inlet end being in fluid flow communication with respect to said cylinder chamber means adjacent said gas side of said piston to facilitate powering of movement thereof toward the final activated position responsive to pressurized gas passing therethrough;
      (4) an cylinder outlet end for receiving liquid under hydraulic pressure therethrough, said cylinder outlet end being in fluid flow communication with respect to said liquid line to supply liquid thereto under hydraulic pressure from within said cylinder chamber means adjacent said piston liquid side responsive to movement of the piston from the initial steady state position toward the final activated position;
   G) a gas cartridge selectively in fluid flow communication with respect to said cylinder inlet end of said liquid injecting cylinder to supply gas under pneumatic pressure therethrough for exerting pneumatic pressure against said piston gas side for urging movement of said piston from the initial steady state position toward the final activated position; and
   H) a gas release mechanism operatively mounted between said gas cartridge and said liquid injecting cylinder, said gas release mechanism being operative to open said gas cartridge for facilitating supplying of gas under pressure therefrom through said cylinder inlet end of said liquid injecting cylinder responsive to sensing of a dangerous condition requiring termination of movement of flow material from the first section of a material flow conduit toward the second section thereof.

2. An apparatus for instantaneously terminating movement of flow material from a first section of a material flow conduit toward a second section thereof as defined in claim 1 wherein the liquid positioned within said housing chamber means of said housing includes a glycol component to resist freezing thereof and a fire retardant component for fire protection.

3. An apparatus for instantaneously terminating movement of flow material from a first section of a material flow conduit toward a second section thereof as defined in claim 1 wherein said gas cartridge comprises a nitrogen gas cartridge.

4. An apparatus for instantaneously terminating movement of flow material from a first section of a material flow conduit toward a second section thereof as defined in claim 1 wherein said burst panel is made of a thermoplastic material.

5. An apparatus for instantaneously terminating movement of flow material from a first section of a material flow conduit toward a second section thereof as defined in claim 4 wherein said burst panel is made of polytetrafluoroethylene.

6. An apparatus for instantaneously terminating movement of flow material from a first section of a material flow conduit toward a second section thereof as defined in claim 1 wherein said inflatable member is made of a flexibly resilient rubber material.

7. An apparatus for instantaneously terminating movement of flow material from a first section of a material flow conduit toward a second section thereof as defined in claim 1 wherein said gas release mechanism further comprises a tamper-resistant safety pin extending therethrough to prevent activation thereof unless removed.

8. An apparatus for instantaneously terminating movement of flow material from a first section of a material flow conduit toward a second section thereof as defined in claim 1 wherein said flow offset section is oriented approximately perpendicularly with respect to the material flow path through said tubular mounting sleeve from the first section of said material flow conduit toward the second section of the material flow conduit.

9. An apparatus for instantaneously terminating movement of flow material from a first section of a material flow conduit toward a second section thereof as defined in claim 1 wherein the cross-sectional flow area of said tubular mounting sleeve is not restricted at any point therealong to facilitate full flow between the first section of the material flow conduit and the second section of the material flow conduit prior to activation.

10. An apparatus for instantaneously terminating movement of flow material from a first section of a material flow conduit toward a second section thereof as defined in claim 1 wherein said inflatable member is at least partially collapsed immediately adjacent said inflation opening means prior to activation of said gas release mechanism to facilitate movement of said inflatable member into said tubular mounting sleeve and to facilitate deployment of said inflatable member therewithin.

11. An apparatus for instantaneously terminating movement of flow material from a first section of a material flow conduit toward a second section thereof as defined in claim 1 wherein said housing includes a liquid nozzle positioned in said housing inlet means and extending into said housing chamber means to facilitate guiding of movement of liquid from said liquid line through said housing inlet means and into said housing chamber means.

12. An apparatus for instantaneously terminating movement of flow material from a first section of a material flow conduit toward a second section thereof as defined in claim 11 further comprising a biasing member positioned adjacent said inflatable member prior to deployment thereof to facilitate the exerting of hydraulic pressure against said burst panel to minimize vibration thereof and wherein said liquid nozzle is positioned in abutment with respect to said biasing member to facilitate biasing against said inflatable member therefrom.

13. An apparatus for instantaneously terminating movement of flow material from a first section of a material flow conduit toward a second section thereof as defined in claim 1 further comprising a biasing member positioned adjacent said inflatable member prior to deployment thereof to facilitate the exerting of hydraulic pressure against said burst panel to minimize vibration thereof.

14. An apparatus for instantaneously terminating movement of flow material from a first section of a material flow conduit toward a second section thereof as defined in claim 13 wherein said biasing member comprises a thermoplastic ball.

15. An apparatus for instantaneously terminating movement of flow material from a first section of a material flow conduit toward a second section thereof as defined in claim 1 wherein said inflatable member is collapsed into a U-shaped configuration immediately adjacent said inflation opening means prior to activation of said gas release mechanism to facilitate movement of said inflatable member into said tubular mounting sleeve and to facilitate deployment of said inflatable member therewithin.

16. An apparatus for instantaneously terminating movement of flow material from a first section of a material flow conduit toward a second section thereof as defined in claim 15 further comprising a thermoplastic ball positioned with U-shaped configuration of said inflatable member prior to deployment thereof to facilitate the exerting of hydraulic pressure against said burst panel to minimize vibration thereof.

17. An apparatus for instantaneously terminating movement of flow material from a first section of a material flow conduit toward a second section thereof as defined in claim 1 wherein said inflatable member includes:
  A) an outer mounting rim fixedly mounted between said flow offset section and said housing immediately surrounding said inflation opening means thereof, said outer mounting rim facilitating mounting of said inflatable member in position and also providing a O-ring shaped gasket between said flow offset section and said housing immediately surrounding said inflation opening means; and
  B) an inner collapsed section positioned within said inflation opening means and within said housing chamber means prior to activation to facilitate deployment thereof within said tubular mounting sleeve after activation.

18. An apparatus for instantaneously terminating movement of flow material from a first section of a material flow conduit toward a second section thereof as defined in claim 1 wherein said burst panel extends approximately parallel with respect to the direction of flow of material through said material flow conduit and through said tubular mounting sleeve.

19. An apparatus for instantaneously terminating movement of flow material from a first section of a material flow conduit toward a second section thereof comprising:
  A) a tubular mounting sleeve including:
    (1) a first sleeve end mounted longitudinally in alignment with respect to a first section of a material flow conduit, said first sleeve end being secured to the first section of the material flow conduit and in fluid flow communication therewith;

(2) a second sleeve end mounted longitudinally in alignment with respect to a second section of a material flow conduit, said second sleeve end being secured to the second section of the material flow conduit and in fluid flow communication therewith, blocking of said tubular mounting sleeve being operative to terminate fluid flow communication from the first portion of the material flow conduit to the second portion thereof for stopping material flow therebetween;

(3) a flow offset section extending laterally from a position along said tubular mounting sleeve between said first sleeve end and said second sleeve end, said flow offset section being in fluid flow communication with respect to said tubular mounting sleeve and with respect to the first and second sections of the material flow conduit wherein the cross-sectional flow area of said tubular mounting sleeve is not restricted at any point therealong to facilitate full flow between the first section of the material flow conduit and the second section of the material flow conduit prior to activation;

B) a housing attached to said flow offset section of said tubular mounting sleeve, said housing including;

(1) a housing chamber means defined therewithin;

(2) a housing inlet means in full fluid flow communication with respect to said housing chamber means and adapted to receive liquid materials passing thereinto;

(3) a inflation opening means in full fluid flow communication with respect to said housing chamber means and adapted to receive liquid materials passing therefrom, said housing being attached to said flow offset section of said tubular mounting sleeve with said inflation opening means immediately thereadjacent;

C) an inflatable member mounted between said inflation opening means and said flow offset section of said tubular mounting sleeve and at least partially extending through said inflation opening means into said housing chamber means prior to expansion thereof, said inflatable member being responsive to hydraulic force being exerted thereupon from within said housing chamber means to inflate by expanding through said inflation opening means to expand and deploy within said tubular mounting sleeve and terminate any flow therethrough from said first sleeve end toward said second sleeve end and also to terminate any material flow from the first section of a material flow conduit toward a second section thereof, said inflatable member being at least partially collapsed immediately adjacent said inflation opening means prior to activation of said gas release mechanism to facilitate movement of said inflatable member into said tubular mounting sleeve and to facilitate deployment of said inflatable member therewithin;

D) a burst panel of thermoplastic material which is positioned between said inflatable member mounted adjacent and extending across said inflation opening means of said housing and said flow offset section of said tubular mounting sleeve and being operative to prevent fluid flow therebetween, said burst panel being frangible responsive to force being exerted thereagainst by said inflatable member to fracture to allow said inflatable member to be expand through said inflation opening means to facilitate inflation of said inflatable member within said tubular mounting sleeve responsive to the flow of liquid under hydraulic pressure thereinto from said housing chamber means;

E) a liquid line in fluid flow communication with respect to said housing inlet means for supplying liquid thereto under hydraulic pressure;

F) a liquid injecting cylinder including glycol in the liquid contained therein and further including:

(1) a cylinder chamber means defined therewithin;

(2) a piston positioned within said cylinder chamber means and movable therewithin between an initial steady state position and a final activated position, said piston including a piston gas side and a piston liquid side oppositely positioned on said piston from said piston gas side;

(3) a cylinder inlet end for receiving gas under pressure therethrough, said cylinder inlet end being in fluid flow communication with respect to said cylinder chamber means adjacent said gas side of said piston to facilitate powering of movement thereof toward the final activated position responsive to pressurized gas passing therethrough;

(4) an cylinder outlet end for receiving liquid under hydraulic pressure therethrough, said cylinder outlet end being in fluid flow communication with respect to said liquid line to supply liquid thereto under hydraulic pressure from within said cylinder chamber means adjacent said piston liquid side responsive to movement of the piston from the initial steady state position toward the final activated position;

G) a gas cartridge containing pressurized nitrogen therein which is positioned selectively in fluid flow communication with respect to said cylinder inlet end of said liquid injecting cylinder to supply gas under pneumatic pressure therethrough for exerting pneumatic pressure against said piston gas side for urging movement of said piston from the initial steady state position toward the final activated position; and H) a gas release mechanism operatively mounted between said gas cartridge and said liquid injecting cylinder, said gas release mechanism being operative to open said gas cartridge for facilitating supplying of gas under pressure therefrom through said cylinder inlet end of said liquid injecting cylinder responsive to sensing of a dangerous condition requiring termination of movement of flow material from the first section of a material flow conduit to the second section thereof.

20. An apparatus for instantaneously terminating movement of flow material from a first section of a material flow conduit toward a second section thereof comprising:

A) a tubular mounting sleeve including:

(1) a first sleeve end mounted longitudinally in alignment with respect to a first section of a material flow conduit, said first sleeve end being secured to the first section of the material flow conduit and in fluid flow communication therewith;

(2) a second sleeve end mounted longitudinally in alignment with respect to a second section of a material flow conduit, said second sleeve end being secured to the second section of the material flow conduit and in fluid flow communication therewith, blocking of said tubular mounting sleeve being operative to terminate fluid flow communication from the first portion of the material flow conduit to the second portion thereof for facilitating stopping of material flow therethrough;

(3) a flow offset section extending laterally from a position along said tubular mounting sleeve between said first sleeve end and said second sleeve end, said flow offset section being in fluid flow communication with respect to said tubular mounting sleeve and with respect to the first and second sections of the material flow conduit wherein the cross-sectional flow area of said tubular mounting sleeve is not restricted at any point therealong to facilitate full flow between the first section of the material flow conduit and the second section of the material flow conduit prior to activation, said flow offset section being oriented approximately perpendicularly with respect to the material flow path through said tubular mounting sleeve extending from the first section of said material flow conduit to the second section of the material flow conduit;

B) a housing attached to said flow offset section of said tubular mounting sleeve, said housing including:
  (1) a housing chamber means defined therewithin;
  (2) a housing inlet means in full fluid flow communication with respect to said housing chamber means and adapted to receive liquid material passing thereinto;
  (3) a liquid nozzle positioned in said housing inlet means and extending into said housing chamber means to facilitate guiding of movement of liquid from said liquid line through said housing inlet means and into said housing chamber means;
  (4) a inflation opening means in full fluid flow communication with respect to said housing chamber means and adapted to receive liquid material passing therefrom, said housing being attached to said flow offset section of said tubular mounting sleeve with said inflation opening means immediately thereadjacent;

C) an inflatable member made of a flexibly resilient rubber material mounted between said inflation opening means and said flow offset section of said tubular mounting sleeve and at least partially extending through said inflation opening means into said housing chamber means prior to expansion thereof, said inflatable member being responsive to hydraulic force being exerted thereupon from within said housing chamber means to inflate by expanding through said inflation opening means to expand and deploy within said tubular mounting sleeve and terminate any flow from said first sleeve end toward said second sleeve end and also to terminate any material flow from the first section to the second section of a material flow conduit, said inflatable member being at least partially collapsed and positioned immediately adjacent said inflation opening means prior to activation of said gas release mechanism to facilitate movement of said inflatable member into said tubular mounting sleeve and to facilitate deployment of said inflatable member therewithin, said inflatable member being collapsed into a U-shaped configuration immediately adjacent said inflation opening means prior to activation to facilitate movement of said inflatable member into said tubular mounting sleeve and to facilitate deployment of said inflatable member therewithin, said inflatable member including:
  (1) an outer mounting rim fixedly mounted between said flow offset section and said housing immediately surrounding said inflation opening means thereof; and
  (2) an inner collapsed section positioned within said inflation opening means and within said housing chamber means prior to activation to facilitate deployment thereof within said tubular mounting sleeve after activation;

D) a burst panel of polytetrafluoroethylene thermoplastic material which is positioned between inflatable member mounted adjacent and extending across said inflation opening means of said housing and said flow offset section of said tubular mounting sleeve and being operative to prevent fluid flow therebetween, said burst panel being frangible responsive to force being exerted thereagainst by said inflatable member to fracture to allow said inflatable member to be expanded through said inflation opening means to facilitate inflation of said inflatable member within said tubular mounting sleeve responsive to the flow of liquid under hydraulic pressure thereinto from said housing chamber means, said burst panel extending approximately parallel with respect to the direction of flow of material through said material flow conduit and through said tubular mounting sleeve;

E) a liquid line in fluid flow communication with respect to said housing inlet means for supplying liquid thereto under hydraulic pressure;

F) a liquid injecting cylinder including glycol component and a fire retardant component in the liquid contained therein and further including:
  (1) a cylinder chamber means defined therewithin;
  (2) a piston positioned within said cylinder chamber means and movable therewithin between an initial steady state position and a final activated position, said piston including a piston gas side and a piston liquid side oppositely positioned on said piston from said piston gas side;
  (3) a cylinder inlet end for receiving gas under-pressure therethrough, said cylinder inlet end being in fluid flow communication with respect to said cylinder chamber means adjacent said gas side of said piston to facilitate powering of movement thereof toward the final activated position responsive to pressurized gas passing therethrough;
  (4) an cylinder outlet end for receiving liquid under hydraulic pressure therethrough, said cylinder outlet end being in fluid flow communication with respect to said liquid line to supply liquid thereto under hydraulic pressure from within said cylinder chamber means adjacent said piston liquid side responsive to movement of the piston from the initial steady state position toward the final activated position;

G) a gas cartridge containing pressurized nitrogen therein which is positioned selectively in fluid flow communication with respect to said cylinder inlet end of said liquid injecting cylinder to supply gas under pneumatic pressure therethrough for exerting pneumatic pressure against said piston gas side for urging movement of said piston from the initial steady state position toward the final activated position;

H) a gas release mechanism operatively mounted between said gas cartridge and said liquid injecting cylinder, said gas release mechanism being operative to open said gas cartridge for facilitating supplying of gas under pressure therefrom through said cylinder inlet end of said liquid injecting cylinder responsive to sensing of a dangerous condition requiring termination of movement of flow material from the first section to the second section of a material flow conduit, said gas release mechanism further comprising a tamper-resistant safety pin extending therethrough to prevent activation thereof unless removed; and I) a thermoplastic biasing member which is generally round and is positioned within said inflatable member when collapsed in a U-shaped configuration prior to deployment thereof to facilitate the exerting of hydraulic pressure against said burst panel to minimize undesirable vibration or other movement thereof, said thermoplastic biasing member being positioned adjacent said inflatable member prior to deployment thereof to facilitate the exerting of hydraulic pressure against said burst panel to minimize vibration thereof and wherein said liquid nozzle is positioned in abutment with said biasing member to facilitate biasing thereof against said inflatable member.

* * * * *